April 30, 1940.    E. H. SMITH    2,199,248

ACETYLENE GENERATOR

Filed Oct. 30, 1939    2 Sheets-Sheet 1

INVENTOR
ELMER H. SMITH
BY Paul, Paul Moore & Giere
ATTORNEYS

April 30, 1940. E. H. SMITH 2,199,248
ACETYLENE GENERATOR
Filed Oct. 30, 1939 2 Sheets-Sheet 2
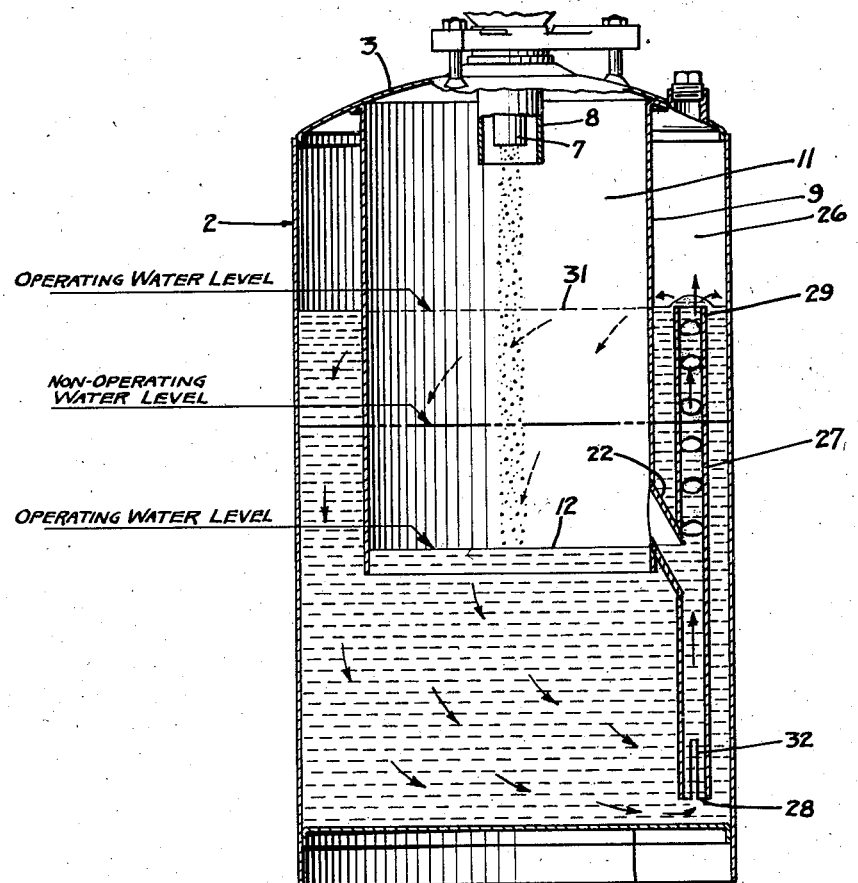
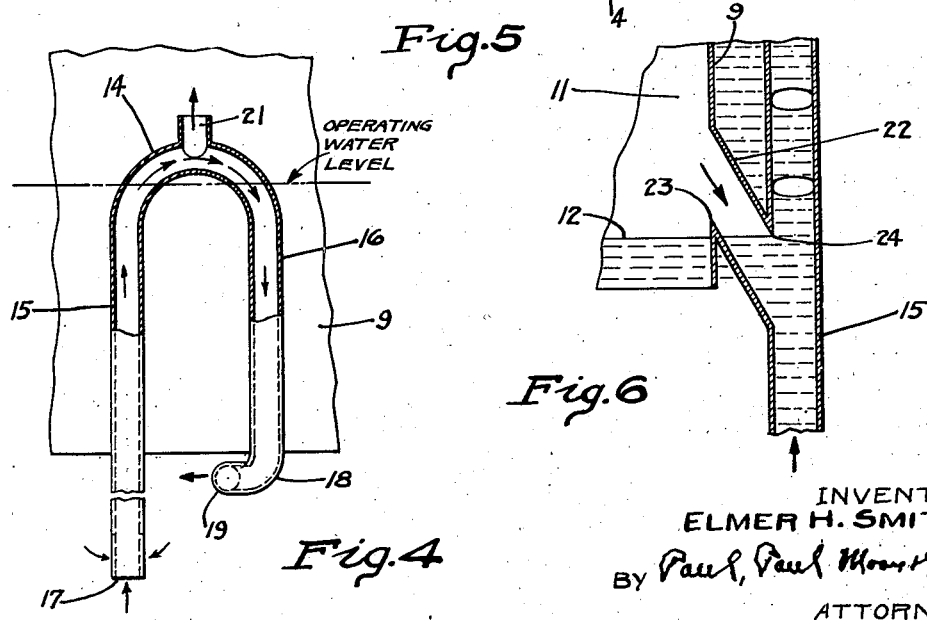
INVENTOR
ELMER H. SMITH
BY Paul, Paul Moore Ginn
ATTORNEYS Patented Apr. 30, 1940

2,199,248

UNITED STATES PATENT OFFICE 2,199,248

ACETYLENE GENERATOR

Elmer H. Smith, Minneapolis, Minn., assignor to Smith Welding Equipment Corporation, Minneapolis, Minn., a corporation of Minnesota Application October 30, 1939, Serial No. 302,016

12 Claims. (Cl. 48—38)

This invention relates to new and useful improvements in acetylene generators and more particularly to such generators of the type using pulverized or granulated carbide.

In operating generators of this type, it is sometimes difficult to prevent the water in the generator casing from overheating, particularly, the water which defines the bottom of the gas generating chamber and onto the surface of which the carbide is precipitated. This results because the instant the carbide particles contact with the water, gas is formed, which tends to heat the surface of the water. Unless some means is provided for constantly circulating the water during operation of the generator, the surface of that portion of the water which constitutes the bottom of the gas generating chamber may, under severe operating conditions, approach a temperature near the boiling point, while the water in the bottom of the generator may be comparatively cool.

Movable parts in a generator for circulating the water therein are objectionable because they require more or less attention and are likely to get out of order. It is therefore highly desirable that some means be provided whereby the water in the generator may be constantly circulated during operation of the generator, thereby to maintain it at a relatively low temperature.

An object of the present invention, therefore, is to provide a water circulating means for a generator which is comparatively simple and comprises no moving parts and which insure constant circulation of the water in the generator, whenever the generator is generating gas.

A further object is to provide a generator having an air lift pump embodied in the construction thereof, adapted to be operated by the flow of gas from the gas generating chamber, whereby each time the generator is operated, all of the water in the generator will be kept in constant circulation, whereby the temperature thereof may be maintained at a relatively low figure.

A further object is to provide an acetylene generator comprising a casing having a shell secured to and depending from the upper wall thereof, with its lower end extending below the level of the water in the casing, and an air lift pump being provided between the walls of the casing and said shell and having a connection with the lower portion of the shell, whereby when the level of the water in the shell is forced downwardly to its operating level, by the pressure of the gas generated therein, the gas will flow from within the shell into the air lift pump, whereby the flow of gas through said pump will impart circulation to the water in the generator, whereby the temperature of the water may be kept relatively low.

A further object is to provide a generator of the class described, comprising a casing having a shell secured to and depending from the upper wall thereof, with its lower end extending below the level of the water in the casing, whereby the water provides a seal for the lower end of the shell, and an upright pipe being positioned between the walls of the shell and casing, with its lower end disposed adjacent to the bottom of the casing and its upper end adjacent to the maximum or operating level of the water in the casing, and said pipe having an inclined spud establishing communication between the intermediate portion thereof and the lower portion of the shell, through which gas may flow from the interior of the shell into said conduit, when the pressure of the gas within the shell has forced the water level therein downwardly to its operating level, or to a level where the spud is opened to permit gas to enter the conduit, the gas thus entering the conduit flowing upwardly through the upper portion thereof and creating a rapid circulation of water through the pipe from the bottom of the casing to the operating level of the water therein, thereby maintaining the water at a relatively low temperature.

A further object of the invention resides in the novel arrangement of the air lift pump within the generator and its connection with the interior of the shell whereby when the water level within the shell has been lowered to its operating level, further flow of water from the interior of the shell through the pump is interrupted and only gas will flow from the shell through the air pump, thereby causing the water in the bottom of the casing to be circulated upwardly through the pump and throughout the entire casing.

Other objects of the invention reside in the unique construction of the air lift pump; in the means provided for preventing the water from entering the upright pipe of the air lift pump from the interior of the shell, when the level of the water therein is at operating level; in the provision of an air lift pump comprising a U-shaped pipe having one leg extending downwardly and terminating short of the bottom of the casing and serving as an intake end, and the other leg of said pipe extending downwardly and inwardly to a point adjacent the lower end of the inner shell, and serving as a discharge end for the pipe, and the intake leg of said pipe having a connection with the interior of the shell adjacent the lower end of the shell, whereby when the water level therein is forced downwardly to its operating level, gas will flow upwardly through the intake leg of the U-shaped pipe and downwardly through the other leg thereof and discharge into the casing directly below and adjacent to the water level within the shell, thereby maintaining the water in the casing in constant circulation during operation of the generator; and, in the simple and inexpensive construction of the water circulating means.

Other objects of the invention will appear from the following description and accompanying drawings and will be pointed out in the annexed claims.

In the accompanying drawings there has been disclosed a structure designed to carry out the various objects of the invention, but it is to be understood that the invention is not confined to the exact features shown as various changes may be made within the scope of the claims which follow.

In the drawings:

Figure 4 is a detail sectional view showing the construction of the U-shaped pipe of the water circulating means;

Figure 5 is a view similar to Figure 2, showing a water circulating means of slightly different construction; and Figure 6 is an enlarged detail sectional view showing the arrangement of the spud which connects the air lift pump to the wall of the inner shell.

Figure 1:
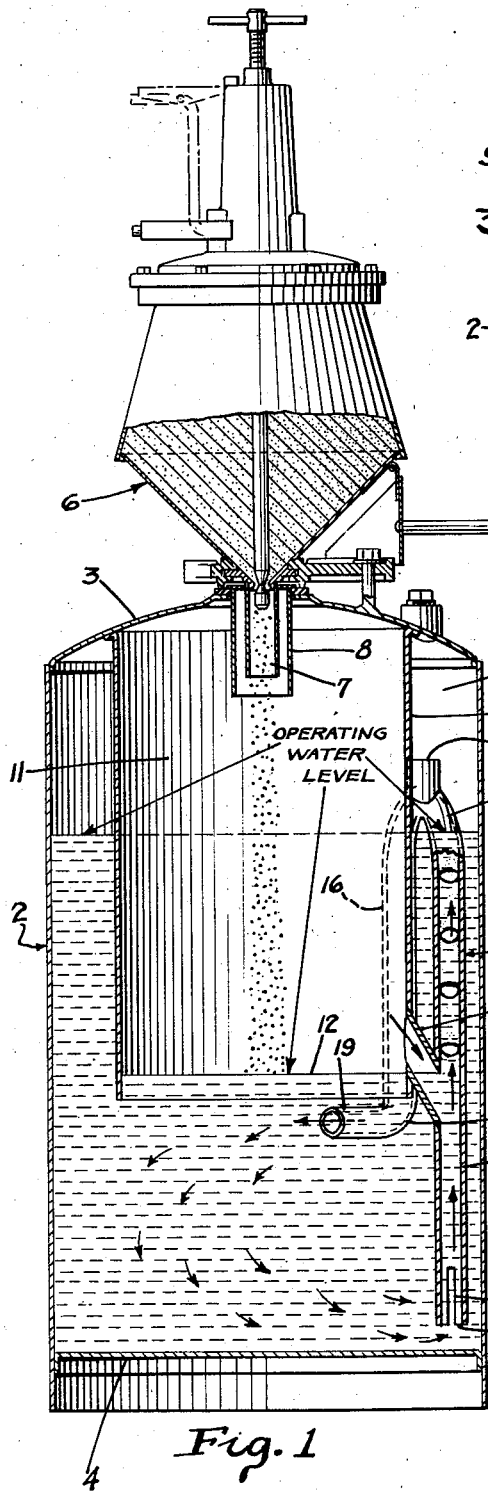
Figure 1 is a vertical sectional view of a conventional generator showing the invention embodied therein, and the positions of the water levels within the casing when the generator is operating.

In the selected embodiment of the invention here shown, there is illustrated in Figure 1, for purposes of disclosure, an acetylene generator comprising a casing, generally designated by the numeral 2, having a top wall 3 and bottom wall 4. A suitable opening 5 is provided in the top wall 3 adapted to receive a carbide feeding mechanism, generally designated by the numeral 6. The carbide feeding mechanism comprises a carbide feeding tube 7 and a splash sleeve or skirt 8, which depends into the upper portion of the casing, as clearly illustrated in Figure 1. Inside the casing 2, there is provided an inner shell 9 having its upper end secured to the upper wall 3 of the casing by such means as welding. The shell 9 depends from the upper wall 3 and has its lower end extending downwardly into the casing to a point below the operating level of the water within the shell, as clearly illustrated in Figures 1 and 5. The lower open end of the shell 9 is thus closed or sealed by the water, whereby the interior of the shell forms a gas generating chamber 11. The lower end or bottom of this chamber is defined by the water level 12, as shown in Figures 1 and 5.

An important feature of the present invention resides in the means provided for circulating the water within the casing, whereby it may be maintained at a more or less uniform temperature. The means provided for thus circulating the water is shown comprising what may be termed an "air lift pump," generally designated by the numeral 13. This pump comprises a pipe having a U-bend 14 at its upper portion, whereby spaced legs 15 and 16 are provided. The leg 15, as shown in Figure 1, extends downwardly into the water in the casing and has its lower end 17 terminating in close proximity to the bottom wall 4 of the casing.

The other leg 16 of the air pump extends downwardly from the U-bend 14 and is preferably provided with a right-angled bend 18, whereby its end portion 19 is substantially horizontally disposed immediately below the lower edge of the inner shell 9. The leg 16 of the air pump serves as a discharge leg, whereby the other leg 15 serves as the intake leg. A gas outlet 21 is provided at the uppermost point of the U-bend 14 to permit the gas to escape from the air pump into the upper portion of the casing exteriorly of the shell. The usual service line or pipe, not shown, is connected to the upper portion of the casing.

Water circulation through the air lift pump 13 is caused by the flow of gas from the gas generating chamber 11, through the upper portion of the intake leg 15 of the air lift. To thus direct the flow of gas into the upper portion of the leg 15, the intermediate portion of said leg is connected to the lower portion of the shell 9 by a suitable spud 22, which is preferably arranged on an incline, as clearly shown in the drawings but may be positioned at any suitable angle relative to the shell. By referring more particularly to Figure 6, it will be noted that the lowermost point 23 of the intake end of the spud 22, is disposed at an elevation slightly above the elevation of the uppermost point 24 of the discharge end of the spud. By so arranging the intake and discharge ends of the spud 22, water cannot enter the leg 15 of the air lift pump from the gas generating chamber 11, during operation of the generator, after the level of the water within the shell reaches the level indicated at 12.

Figure 2:
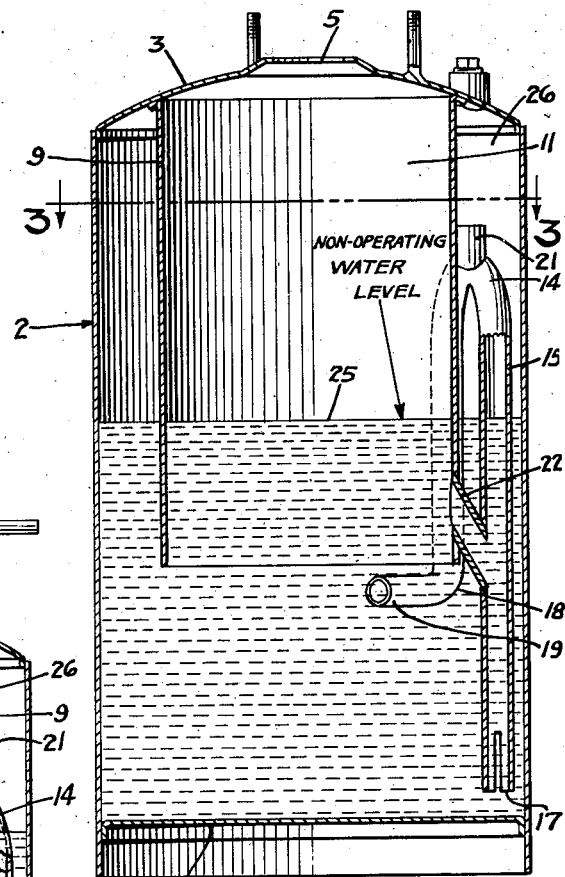
Figure 2 is a vertical sectional view similar to Figure 1 with the carbide feeding mechanism removed from the casing and showing the water in the casing at non-operating level.
Figure 3:
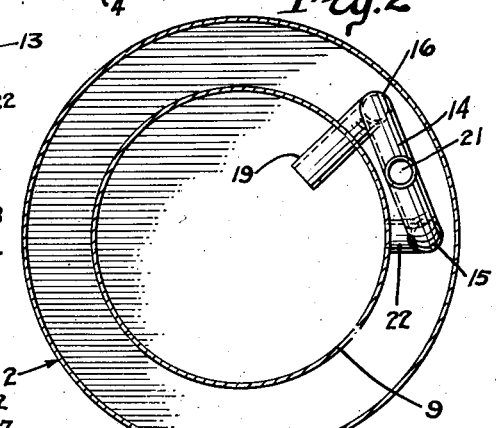
Figure 3 is a cross-sectional view on the line 3—3 of Figure 2.

In the operation of the apparatus, as shown in Figures 1 to 4, inclusive, when the carbide feeding mechanism is started, carbide is precipitated onto the non-operating level 25 of the water within the gas generating chamber 11, defined by the shell 9, as shown in Figure 2. The instant the finely comminuted carbide contacts the surface of the water within the gas generating chamber 11, gas is generated and begins to build up a pressure within the gas generating chamber. Such development of gas pressure within the chamber forces the level of the water within the shell 9 or gas generating chamber 11 downwardly until it reaches its operating level 12, below the intake end of the spud 22. The gas then flows through the spud and into the leg 15 in the form of large bubbles which carry the water upwardly through the leg 15 with sufficient velocity to create a suction at the lower end 17 of the leg 15. The gas thus rising, together with the water in the leg 15, escapes through the gas outlet 21 of the air lift pump, and the water thus elevated in the leg 15 flows downwardly through the leg 16 and is discharged in a horizontal direction below the level of the water 12 within the shell 9, as clearly illustrated in Figure 1. As long as the carbide feeding mechanism continues to precipitate carbide into the water within the shell 9, gas is generated therein and will discharge into the leg 15 of the air lift pump, from whence it will discharge into the upper portion 26 of the casing, through the gas outlet 21. It will thus be seen that the water within the casing is kept in constant circulation so long as the generator is operating. When the supply of carbide to the interior of the shell 9 is cut off, the water within the general casing may eventually find its normal or non-operating level 25, shown in Figure 2.

In Figure 5 I have shown another construction wherein an air lift pump, comprising a single upright pipe or tube 27 having a connection with the lower portion of the shell 9 by means of a spud 22, similar to the one shown in Figures 1 and 2. The lower portion of the pipe 27 extends downwardly with its lower end 28 terminating adjacent to the bottom wall 4 of the casing, in a manner similar to the lower end 17 of the leg 15 of the air lift pump 13. The upper end 29 of the pipe 27 terminates at or near the operating water level 31 within the casing 2.

The water circulating means illustrated in Figure 5, operates on the air lift principle, in a manner similar to the structure disclosed in the previous figures. Gas enters the pipe 27 through the spud 22 and rises therein in the form of large bubbles. These bubbles intermix more or less with the water in the pipe and as they rise in the pipe, they create a water circulation therein, as indicated by the arrows, which imparts circulation to substantially all of the water in the casing. Suitable longitudinal slots 32 may be provided in the lower ends of the leg 15 and pipe 27 to prevent sediment, which may accumulate in the bottom of the casing, from obstructing water circulation therethrough.

From the foregoing, it will be noted that circulation of water in the casing is accomplished without utilizing any moving parts. The water circulating means is extremely simple and, as is understood from the foregoing, is made operable entirely by the flow of gas from the gas generating chamber 11. As soon as the generation of gas within the chamber 11 is interrupted, the water circulating means becomes inoperative and remains so until carbide is again delivered into the water within the chamber 11. The water circulating means thus operates automatically and requires no attention on the part of an operator or attendant, which is a very desirable feature and obviously reduces the cost of operation and maintenance.

I claim as my invention:

1. In an acetylene generator, a casing having water therein, a shell secured to and depending from the upper portion of the casing and having its lower end open and extending below the level of the water in the casing, means for feeding carbide into the water within the shell whereby gas is generated in the shell, and an air lift pump within the casing comprising an upright pipe having its ends open, and a spud connecting said pipe to the interior of the shell, whereby when the generator is operated and the level of the water in the shell is lowered sufficiently to expose the spud, gas will flow from the shell through said spud and pipe and thereby cause circulation of the water in the casing.

2. In an acetylene generator, a casing having water therein, a shell secured to and depending from the upper portion of the casing and having its lower end open and extending into the water in the casing, whereby the water provides a seal for the lower end of the shell, an upright water circulating pipe disposed between the walls of the casing and said shell and having its ends open to permit water circulation through the pipe, said pipe having a connection with the lower portion of the shell below the non-operating water level therein for the introduction of the generated gas into the pipe, and means for feeding carbide into the water within the shell whereby gas is generated in the shell and forces the water level therein downwardly to expose said connection, whereby gas will flow from the shell and upwardly through said pipe and thereby cause the water in the casing to circulate through said pipe during operation of the generator.

3. In an acetylene generator, a casing having water therein, a shell secured to and depending from the upper portion of the casing, the lower end of said shell being open and extending below the level of the water in the casing, whereby the water provides a seal for the lower end of the shell, means for feeding carbide into the water within the shell whereby gas is generated therein, and an air lift pump comprising an upright pipe, open at both ends, and having means connecting it with the lower portion of the shell, whereby when the water level in the shell is lowered to a predetermined point by gas pressure in the shell, gas will flow through a portion of said pipe and thereby cause circulation of the water within the casing, during operation of the generator.

4. In an acetylene generator, a casing having water therein, a shell secured to and depending from the upper portion of the casing with its lower open end extending below the level of the water in the casing, whereby the water provides a seal for the lower end of the shell, means for feeding carbide into the water within the shell whereby gas is generated therein, and an air lift pump within the generator comprising a pipe disposed exteriorly of the shell, said pipe being open at both ends and having its intermediate portion in communication with the interior of the shell below the operating water level in the casing, whereby gas may enter the pipe from said shell and cause the water in the casing to circulate through said pipe, during operation of the generator.

5. In an acetylene generator, a casing having water therein, a shell secured to the upper wall of the casing and depending therefrom and having its lower end submerged in the water in the casing, the diameter of said shell being less than the diameter of the casing, whereby an annular chamber is provided between the walls of the casing and shell, means for feeding pulverized carbide into the water within the shell, and an open-ended upright conduit in said annular chamber having means for connecting the intermediate portion thereof with the interior of the shell, when the water level in the shell is forced downwardly by the pressure of gas therein, whereby gas will escape into said conduit and cause the water in the casing to circulate therethrough during operation of the generator.

6. In an acetylene generator, a casing having water therein, a shell secured to the upper wall of the casing and depending therefrom and having its lower end submerged in the water in the casing, the diameter of said shell being less than the diameter of the casing, whereby an annular chamber is provided around the shell, means for feeding pulverized carbide into the water within the shell, and an air lift pump comprising an upright pipe, open at both ends, and having its intermediate portion in communication with the interior of the shell adjacent the lower portion of the shell, whereby when the level of the water within the shell is forced downwardly by the generation of gas therein, gas will escape into the air lift pipe and thereby cause the water within the generator to circulate therethrough during operation of the generator.

7. In an acetylene generator, a casing partially filled with water, a shell secured to and depending from the upper portion of the casing with its lower open end extending below the level of the water in the casing, means for feeding carbide into the water within the shell whereby gas is generated therein, a pipe disposed within the generator and open at its ends to permit water circulation therethrough, said pipe having its intake end disposed near the bottom of the casing and having its upper end disposed near the maximum water level in the casing, and means for establishing communication between the interior of said shell and the intermediate portion of said pipe, when the gas pressure in the shell reaches a predetermined figure, whereby gas will flow from the shell and upwardly through a portion of said pipe and thereby cause the water in the casing to circulate through the pipe, when the generator is operating.

8. In an acetylene generator, a casing partially filled with water, a shell secured to and depending from the upper portion of the casing with its lower end extending below the level of the water in the casing, whereby the water provides a seal for the lower end of the shell, means for feeding carbide into the water within the shell whereby gas is generated therein, an air lift pump disposed within the generator and comprising a U-shaped pipe having downwardly extending spaced intake and discharge legs, the open end of the intake leg being disposed adjacent to the bottom wall of the casing and the discharge end of the other leg being disposed adjacent to the lower end of the shell, and means connecting the intake leg with the interior of the shell, whereby when the water level in the shell is forced downwardly by gas pressure therein, the gas will enter and flow upwardly through said leg and cause the water in the generator to circulate through said U-shaped pipe, said U-shaped pipe having a gas discharge opening in its uppermost portion.

9. In an acetylene generator, a casing partially filled with water, a shell secured to and depending from the upper portion of the casing with its lower open end extending below the level of the water in the casing, said shell and the water level therein cooperating to form a gas generating chamber, means for feeding carbide into the water in said gas generating chamber, whereby gas is generated therein, an upright conduit within the casing, normally filled with water and having an inlet and an outlet for the water, and an inclined spud adapted to establish communication between said conduit and the lower portion of the gas generating chamber, when the water level in said chamber is forced downwardly by gas pressure in the chamber, whereby gas will flow upwardly through said conduit and thereby cause the water in the casing to constantly circulate through said conduit, when the generator is operating.

10. In an acetylene generator, a casing partilly filled with water, a shell secured to and depending from the upper portion of the casing with its lower end open and extending below the level of the water in the casing, said shell and the water level therein cooperating to form a gas generating chamber, means for feeding carbide into the water in said gas generating chamber, whereby gas is generated therein, an upright conduit within the casing normally filled with water and having an inlet and an outlet for the water, an inclined spud adapted to establish communication between said conduit and the lower portion of the gas generating chamber, when the water level in said chamber is forced downwardly to its operating level by gas pressure in the chamber, whereby gas will flow upwardly through said conduit and thereby cause the water in the casing to constantly circulate through said conduit, when the generator is operating, and means whereby when the water in the shell is lowered to operating level, no water will enter the conduit from within the shell.

11. In an acetylene generator, a casing partially filled with water, a shell secured to and depending from the upper portion of the casing with its lower open end extending below the level of the water in the casing, said shell and the water level therein cooperating to form a gas generating chamber, means for feeding carbide into the water in the gas generating chamber, whereby gas is generated therein, an upright conduit within the casing, normally filled with water and having an inlet and an outlet for the water, an inclined spud adapted to establish communication between said conduit and the lower portion of the gas generating chamber, when the water level in said chamber is forced downwardly to a point where the spud is opened, by gas pressure in the chamber, gas will flow upwardly through said conduit and thereby cause the water in the casing to constantly circulate through said conduit, when the generator is operating, and the lowermost portion of the receiving end of said spud being disposed on an elevation above the uppermost portion of the discharge end of the spud, whereby when the water in the shell is at operating level, gas only can enter the conduit from the interior of the shell, and whereby water circulation through the conduit is stimulated.

12. In an acetylene generator, a casing having water therein; a shell depending from an upper wall of the casing and having its lower end submerged in the water in the casing, the casing, shell, said upper wall and the water level in the casing defining a chamber; and an air lift pump comprising an upright pipe having an inlet for the water near the bottom of the casing and an outlet in the defined chamber, said pipe having its intermediate portion in communication with the interior of the shell near the lower portion of the shell whereby when the water within the shell is forced downwardly by the generation of gas therein, gas will escape into the upright pipe through the communication in the intermediate portion thereof and thereby cause the water within the generator to circulate through said pipe during operation of the generator.

ELMER H. SMITH.